(12) United States Patent
Tang

(10) Patent No.: US 11,343,796 B2
(45) Date of Patent: May 24, 2022

(54) METHOD FOR PAGING, TERMINAL EQUIPMENT, AND NETWORK EQUIPMENT

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/944,378

(22) Filed: Jul. 31, 2020

(65) Prior Publication Data

US 2020/0367200 A1 Nov. 19, 2020

Related U.S. Application Data

(63) Continuation of application No. PCT/CN2018/074846, filed on Jan. 31, 2018.

(51) Int. Cl.
*H04W 68/02* (2009.01)
*H04W 72/04* (2009.01)

(52) U.S. Cl.
CPC ......... *H04W 68/02* (2013.01); *H04W 72/042* (2013.01)

(58) Field of Classification Search
CPC . H04W 68/02; H04W 72/042; H04W 68/005; H04W 48/08; H04W 72/1289
USPC ....................................................... 455/458
See application file for complete search history.

(56) References Cited

U.S. PATENT DOCUMENTS

| 9,769,793 | B2 | 9/2017 | Zarifi |
| 10,609,676 | B1 | 3/2020 | Agiwal et al. |
| 2013/0115977 | A1 | 5/2013 | Chandramouli |
| 2014/0248915 | A1 | 9/2014 | Chandramouli et al. |
| 2016/0338006 | A1 | 11/2016 | Lee et al. |
| 2017/0195987 | A1 | 7/2017 | Zarifi |

(Continued)

FOREIGN PATENT DOCUMENTS

| CN | 105992342 A | 10/2016 |
| CN | 107529158 A | 12/2017 |

(Continued)

OTHER PUBLICATIONS

International Search Report in the international application No. PCT/CN2018/074846, dated Oct. 22, 2018.

(Continued)

*Primary Examiner* — Hirdepal Singh

(57) ABSTRACT

Provided are a method for paging, a terminal equipment, and a network equipment. The method comprises: a terminal equipment receives indication information sent by a network equipment, the indication information being used for indicating the paging mode used by the current cell of the terminal equipment; the terminal equipment obtains a paging message according to the indication information. In embodiments of the present invention, a network equipment indicates, by means of the indication information, the paging mode used by the current cell of a terminal equipment, so that the terminal equipment can distinguish the paging mode used by the current cell of the terminal equipment, thus paging-related information can be correctly decoded, thereby correctly obtaining a paging message.

6 Claims, 2 Drawing Sheets

(56) References Cited

U.S. PATENT DOCUMENTS

| | | | |
|---|---|---|---|
| 2017/0318558 A1* | 11/2017 | Li | H04W 72/0446 |
| 2017/0367069 A1 | 12/2017 | Agiwal et al. | |
| 2018/0007659 A1 | 1/2018 | Zarifi | |
| 2018/0368101 A1* | 12/2018 | Agiwal | H04W 68/00 |
| 2019/0159165 A1 | 5/2019 | Agiwal et al. | |
| 2020/0077359 A1 | 3/2020 | Agiwal et al. | |
| 2020/0092845 A1* | 3/2020 | Cai | H04W 68/00 |
| 2020/0236647 A1 | 7/2020 | Agiwal et al. | |
| 2020/0344719 A1* | 10/2020 | Luo | H04W 68/02 |
| 2020/0351816 A1* | 11/2020 | Persson | H04W 68/00 |
| 2020/0374921 A1* | 11/2020 | Li | H04W 8/26 |

FOREIGN PATENT DOCUMENTS

| | | |
|---|---|---|
| EP | 3240338 A1 | 11/2017 |
| WO | 2017076624 A1 | 5/2017 |

OTHER PUBLICATIONS

Samsung; "Analysis of Paging Overhead in Beamformed System", 3GPP TSG-RAN WG2 Meeting # 97, R2-1700822, Athens, Greece, Feb. 13-17, 2017, entire document.

Interdigital Inc: "Paging Indicator Design", 3GPP Draft; R2-1801122 (R15 NR WL AI10456 PagingIndicatorDetails), 3rd Generation Partnership Project (3GPP), Mobile Competence Centre; 650, Route Des Lucioles; F-06921 Sophia-Antipolis Cedex; Fran, vol. RAN WG2, No. Vancouver, Canada; Jan. 22, 2018-Jan. 26, 2018, Jan. 12, 2018 (Jan. 12, 2018), XP051386595, *the whole document *.

Supplementary European Search Report in the European application No. 18903501.7, dated Oct. 21, 2020.

Written Opinion of the International Search Authority in the international application No. PCT/CN2018/074846, dated Oct. 22, 2018.

First Office Action of the European application No. 18903501.7, dated Nov. 5, 2021.

* cited by examiner

METHOD FOR PAGING, TERMINAL EQUIPMENT, AND NETWORK EQUIPMENT

CROSS-REFERENCE TO RELATED APPLICATION

This is a continuation application of International Application No. PCT/CN2018/074846 filed on Jan. 31, 2018, the contents of which are hereby incorporated by reference in its entirety.

TECHNICAL FIELD

Embodiments of the disclosure relate to the field of communication, and more particularly to a method for paging, a terminal device and a network device.

BACKGROUND

Along with pursuit for rate, delay, high-speed mobility, efficiency and diversification and complication of services in the future life, the 3rd Generation Partnership Project (3GPP) international standard organization has started developing 5-Generation (5G) communication technologies. Main application scenarios of 5G are Enhance Mobile Broadband (eMBB), Ultra-Reliable and Low latency Communication (URLLC) and massive Machine Type of Communication (mMTC).

During early deployment of 5G New Radio (NR), a 5G NR User Equipment (UE), like a Long Term Evolution (LTE) UE, may be attached and registered in a Core Network (CN) at first, then the CN has context information of the UE, which includes a Tracking Area (TA) list, and when the UE is paged, the CN transmits paging messages at all base stations corresponding to the TA list and triggers these base stations to page the UE in all cells covered by the base stations. Therefore, a paging range of a UE includes all cells in a range of a TA list, and a paging message is transmitted in this range.

In 5G NR, a multi-beam form is adopted for a cell, so that it is necessary to send a paging message in each beam of each cell to page the UE. For a cell deployed at a high frequency, more beams, for example, 64, are adopted, so paging is performed for 64 times in the cell. This increases a signaling load of a network. To this end, a solution for reducing paging signaling load, i.e., a paging-indicator-based solution, is proposed in the standard. A Paging Indicator (PI) is allocated to the UE, and multiple UE correspond to a PI. The UE receives the PI at first, and the UE, if considering that there is a paging message for it, requests a base station to send the paging message in a Random Access Channel (RACH) initiation procedure. Therefore, in the future, there may be various paging solutions but a conventional paging solution may also be reserved.

Therefore, how to distinguish a specific paging solution for a present cell by the UE is a problem urgent to be solved.

DETAILED DESCRIPTION

Figure 1:
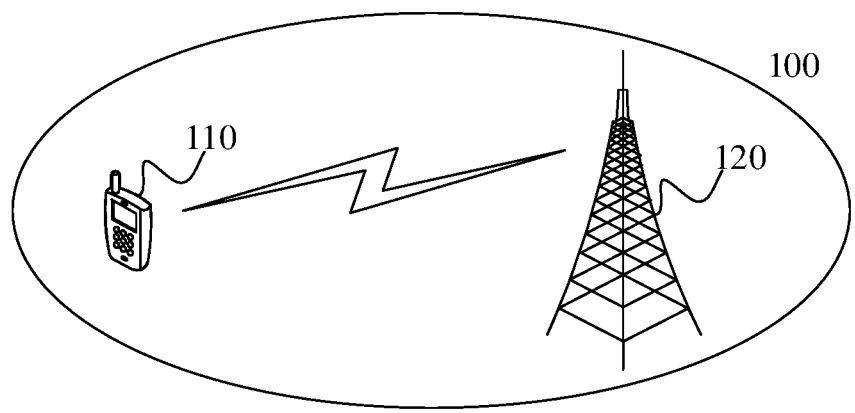
FIG. 1 is an example of an application scenario according to the disclosure.

The disclosure provides a method for paging, a terminal device and a network device, which can enable a terminal device to distinguish a paging manner used by a present cell for the terminal device.

A first aspect provides a method for paging, which may include the following operations.

A terminal device receives indication information sent by a network device. The indication information is used for indicating a paging manner used by a present cell for the terminal device.

The terminal device acquires a paging message according to the indication information.

In the embodiments of the disclosure, the network device indicates the paging manner used by a present cell for the terminal device through the indication information, so that the terminal device can distinguish the paging manner for the present cell of the terminal device and can further correctly decode paging related information and correctly acquire the paging message.

In some possible implementation modes, the operation that the terminal device receives the indication information sent by the network device may include the following operation.

The terminal device receives System Information (SI) sent by the network device. The SI includes the indication information.

In some possible implementation modes, the operation that the terminal device receives the indication information sent by the network device may include the following operation.

The terminal device receives a Physical Downlink Control Channel (PDCCH) scrambled by a Paging Radio Network Temporary Identifier (P-RNTI) from the network device. The PDCCH includes the indication information.

In some possible implementation modes, the PDCCH may further include scheduling information of the paging message.

In some possible implementation modes, the operation that the terminal device receives the indication information sent by the network device may include the following operation.

The terminal device receives a first message sent by the network device. The first message includes the indication information and the paging message.

The operation that the terminal device acquires the paging message according to the indication information may include the following operation.

The terminal device acquires the paging message in the first message according to the indication information.

In some possible implementation modes, the paging manner may include any one of the following: a first paging manner and a second paging manner.

The first paging manner may indicate that a CN device triggers an access network device to transmit a paging message and a paged terminal device is identified by a System Architecture Evolution (SAE) Temporary Mobile Subscriber Identity (S-TMSI). The second paging manner may indicate that the CN device triggers the access network device to transmit the paging message and the paged terminal device is identified by a PI.

A second aspect provides a method for paging, which may include the following operations.

A network device generates indication information. The indication information is used for indicating a paging manner used by a present cell for a terminal device.

The network device sends the indication information to the terminal device to enable the terminal device to acquire a paging message according to the indication information.

In some possible implementation modes, the operation that the network device sends the indication information to the terminal device may include the following operation.

The network device sends SI to the terminal device. The SI includes the indication information.

In some possible implementation modes, the operation that the network device sends the indication information to the terminal device may include the following operation.

The network device sends a PDCCH scrambled by a P-RNTI to the terminal device. The PDCCH includes the indication information.

In some possible implementation modes, the PDCCH may further include scheduling information of the paging message.

In some possible implementation modes, the operation that the network device sends the indication information to the terminal device may include the following operation.

The network device sends a first message to the terminal device. The first message includes the indication information and the paging message, to enable the terminal device to acquire the paging message in the first message according to the indication information.

In some possible implementation modes, the paging manner may include any one of the following: a first paging manner and a second paging manner.

The first paging manner may indicate that a CN device triggers an access network device to transmit a paging message and a paged terminal device is identified by an S-TMSI. The second paging manner may indicate that the CN device triggers the access network device to transmit the paging message and the paged terminal device is identified by a PI.

A third aspect provides a terminal device, which may include a receiving unit and an acquisition unit.

The receiving unit may be configured to receive indication information sent by a network device, the indication information being used for indicating a paging manner used by a present cell for the terminal device.

The acquisition unit may be configured to acquire a paging message according to the indication information.

A fourth aspect provides a terminal device, which may include a transceiver and a processor.

The transceiver is configured to receive indication information sent by a network device. The indication information is used for indicating a paging manner used by a present cell for the terminal device.

The processor is configured to acquire a paging message according to the indication information.

A fifth aspect provides a network device, which may include a generation unit and a sending unit.

The generation unit may be configured to generate indication information, the indication information being used for indicating a paging manner used by a present cell for a terminal device.

The sending unit may be configured to send the indication information to the terminal device to enable the terminal device to acquire a paging message according to the indication information.

A sixth aspect provides a network device, which may include a processor and a transceiver.

The processor is configured to generate indication information. The indication information is used for indicating a paging manner used by a present cell for a terminal device.

The transceiver is configured to send the indication information to the terminal device to enable the terminal device to acquire a paging message according to the indication information.

A seventh aspect provides a computer-readable medium, which is configured to store a computer program. The computer program includes an instruction configured to execute the method embodiment of the first aspect or the second aspect.

An eighth aspect provides a computer chip, which includes an input interface, an output interface, at least one processor and a memory. The processor is configured to execute a code in the memory. When the code is executed, the processor may implement each process executed by the terminal device in the method for paging in the first aspect or the second aspect.

A ninth aspect provides a computer chip, which includes an input interface, an output interface, at least one processor and a memory. The processor is configured to execute a code in the memory. When the code is executed, the processor may implement each process executed by the network device in the method for paging in the first aspect or the second aspect.

A tenth aspect provides a communication system, which includes the abovementioned network device and terminal device.

FIG. 1 is a schematic diagram of an application scenario according to an embodiment of the disclosure.

As illustrated in FIG. 1, a communication system 100 may include a terminal device 110 and a network device 120. The network device 120 may communicate with the terminal device 110 through an air interface. Multi-service transmission is supported between the terminal device 110 and the network device 120.

It is to be understood that the embodiments of the disclosure are described only with the communication system 100 as an example but the embodiments of the disclosure are not limited thereto. That is, the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, LTE Time Division Duplex (TDD), and a Universal Mobile Telecommunication System (UMTS) or the like.

Each embodiment of the disclosure is described in combination with the network device and the terminal device.

The network device 120 may refer to any entity configured to send or receive a signal on a network side, and for example, may be MTC UE, a Base Transceiver Station (BTS) in the GSM or CDMA, a NodeB in WCDMA, an Evolutional Node B (eNB or eNodeB) in LTE, a base station device in a 5G network or the like.

The terminal device 110 may be any terminal device. Specifically, the terminal device 110 may communicate with one or more CNs through a Radio Access Network (RAN), may also be called an access terminal, a UE, a user unit, a user station, a mobile station, a mobile radio station, a remote station, a remote terminal, a mobile device, a user terminal, a terminal, a wireless communication device, a user agent or a user device, and for example, may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the 5G network or the like.

It is to be understood that, when the communication system 100 includes a 5G NR communication system, for example, a mixed deployment scenario formed by a 5G communication system and a first communication system, the first communication system may be any communication system, for example, an LTE system, LTE TDD and a UMTS. A 5G NR UE, like an LTE UE, may be attached and registered in a CN at first, then the CN has context information of the UE that includes a TA list, and when the UE is paged, the CN transmits paging messages at all base stations corresponding to the TA list and triggers these base stations to page the UE in all cells covered by the base stations. Therefore, a paging range of a UE includes all cells in a range of a TA list, and a paging message is transmitted in this range.

However, in the 5G NR, a multi-beam form is adopted for a cell, so that it is necessary to send a paging message in each beam of each cell to page the UE. For a cell deployed at a high frequency, more beams, for example, 64, are adopted, so paging is performed for 64 times in the cell. This increases a signaling load of a network. To this end, a solution for reducing paging signaling load, i.e., a paging-indicator-based solution, is proposed in the standard. A PI is allocated to the UE, and multiple UE corresponds to a PI. The UE receives the PI at first, and the UE, if considering that there is a paging message for it, requests a base station to send the paging message in a RACH initiation procedure. Therefore, in the future, there may be various paging solutions but a conventional paging solution may also be reserved. Therefore, how to distinguish a specific paging solution for a present cell by the UE is a problem urgent to be solved.

For solving the above technical problem, the embodiments of the disclosure provide a method for paging, to enable a terminal device to distinguish a paging manner used by a present cell for the terminal device.

Figure 2:
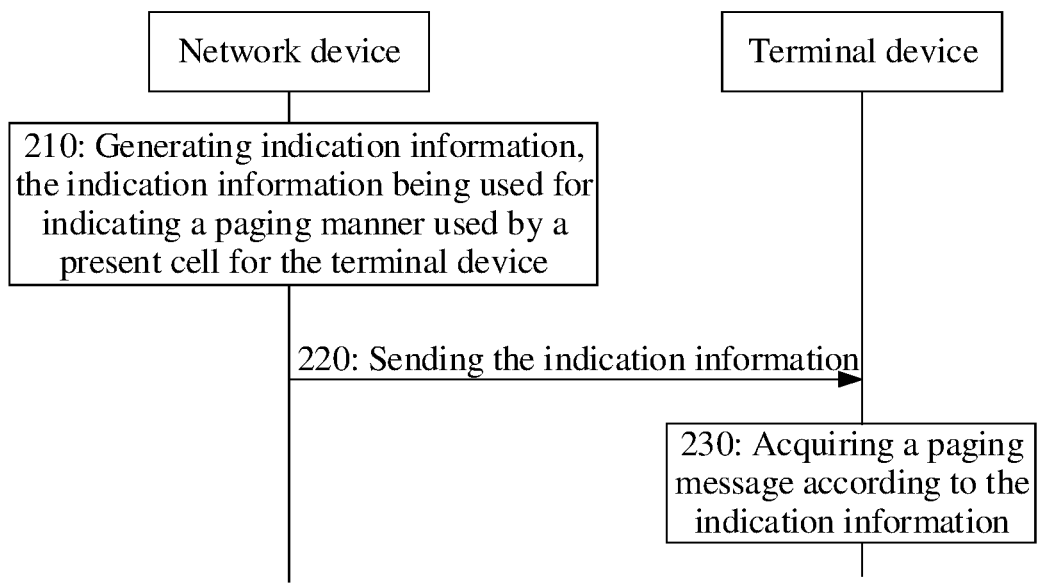
FIG. 2 is a schematic flowchart of a method for paging according to an embodiment of the disclosure.

FIG. 2 is a schematic flowchart of a method for paging according to an embodiment of the disclosure.

Specifically, as illustrated in FIG. 2, the method includes the following operations.

In 210, a network device generates indication information, the indication information being used for indicating a paging manner used by a present cell for a terminal device.

In 220, the network device sends the indication information to the terminal device.

In 230, the terminal device acquires a paging message according to the indication information.

Specifically, a CN, when sending a paging message to an access network, may send the paging message to all access network devices such as Radio Network Controllers (RNCs) in a routing area or local location area range where the UE is located, and the access network device, after receiving the paging message, pages the UE in all cells under the coverage of the access network. In the embodiment of the disclosure, the network device indicates the paging manner used by the current cell for the terminal device through the indication information, so that the terminal device, before receiving the paging message, can distinguish the paging manner used by the current cell for the terminal device, thereby correctly decoding paging related information and correctly acquiring the paging message.

It is to be understood that the paging manner involved in the embodiment of the disclosure includes, but not limited to the following paging manners:

a first paging manner and a second paging manner.

The first paging manner refers to that a CN device triggers an access network device to transmit a paging message and a paged terminal device is identified by an S-TMSI. The second paging manner refers to that the CN device triggers the access network device to transmit the paging message and the paged terminal device is identified by a PI.

In the embodiments of the disclosure, terms "first" and "second" are only adopted to distinguish different paging manners and not intended to form other limits to the embodiments of the disclosure.

It is also to be understood that the above is only exemplary descriptions about the first paging manner and the second paging manner, and the embodiments of the disclosure are not limited thereto.

For example, in the embodiments of the disclosure, the paged terminal device may also be identified by an International Mobile Subscriber Identity (IMSI), a Temporary IMSI (TIMSI), a Packet-Temporary Mobile Subscriber Identity (P-TMSI) or an International Mobile Equipment Identity (IMEI).

A sending or receiving manner for the indication information will be exemplarily described below. It is to be understood that the manner for sending the indication information to the terminal device by the network device is similar to the manner for receiving the indication information by the terminal device. For avoiding repetitions, exemplary descriptions will be made below with an implementation of the operation that the terminal device receives the indication information as an example.

In an embodiment, the terminal device receives System Information (SI) sent by the network device, and the SI may include the indication information. In other words, the network device sends this indication to the UE through a system broadcast. The UE reads the system broadcast to acquire the indication information for the paging manner and further acquire the paging message.

In another embodiment, the terminal device receives a Physical Downlink Control Channel (PDCCH) scrambled by a Paging Radio Network Temporary Identifier (P-RNTI) from the network device, and the PDCCH may include the indication information. That is, the network device contains an indication for the paging mode in the PDCCH scrambled by the P-RNTI to indicate the paging manner for the present cell of the terminal device to the terminal device, so that the terminal device, before receiving the paging message, may decode the PDCCH scrambled by the P-RNTI to acquire the paging manner and further acquire the paging message.

Furthermore, the PDCCH may further include scheduling information of the paging message.

Specifically, in the embodiment of the disclosure, the scheduling information may be used for indicating a resource position of the paging message in a Physical Downlink Shared Channel (PDSCH), so that the terminal device may receive the paging message based on the resource position.

In another embodiment, the terminal device may receive a first message sent by the network device, and the first message includes the indication information and the paging message. The terminal device acquires the paging message in the first message according to the indication information.

That is, the network device contains an indication for the paging mode in the paging message. Furthermore, the terminal device may decode the paging message to acquire the paging manner and a corresponding paging content.

It is to be understood that the above sending or receiving manne for the indication information is only exemplarily described and the embodiments of the disclosure are not limited thereto.

Figure 3:
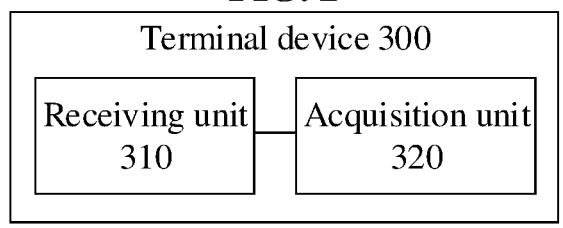
FIG. 3 is a schematic block diagram of a terminal device according to an embodiment of the disclosure.

FIG. 3 is a schematic block diagram of a terminal device according to an embodiment of the disclosure.

Specifically, as illustrated in FIG. 3, the terminal device may include a receiving unit 310 and an acquisition unit 320.

The receiving unit 310 is configured to receive indication information sent by a network device. The indication information is used for indicating a paging manner used by a present cell for the terminal device. The acquisition unit 320 is configured to acquire a paging message according to the indication information.

In at least one embodiment, the receiving unit 310 is specifically configured to receive SI sent by the network device. The SI includes the indication information.

In at least one embodiment, the receiving unit 310 is specifically configured to receive a PDCCH scrambled by a P-RNTI from the network device. The PDCCH includes the indication information.

In at least one embodiment, the PDCCH further includes scheduling information of the paging message.

In at least one embodiment, the receiving unit 310 is specifically configured to: receive a first message sent by the network device, the first message including the indication information and the paging message. The acquisition unit 320 is specifically configured to acquire the paging message in the first message according to the indication information.

In at least one embodiment, the paging manner includes any one of the following: a first paging manner and a second paging manner.

The first paging manner refers to that a CN device triggers an access network device to transmit a paging message and a paged terminal device is identified by an S-TMSI. The second paging manner refers to that the CN device triggers the access network device to transmit the paging message and the paged terminal device is identified by a PI.

Figure 4:
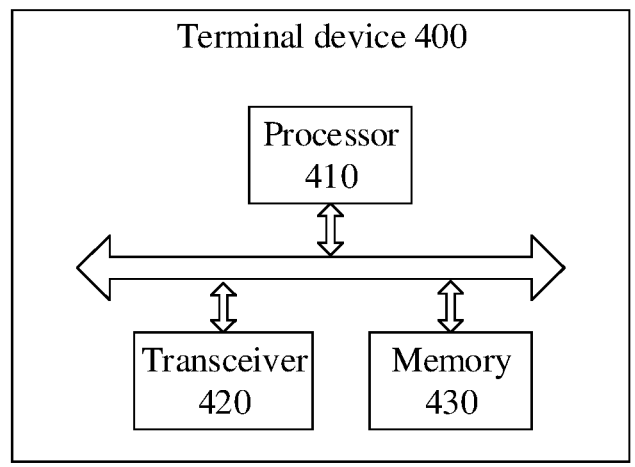
FIG. 4 is a schematic block diagram of another terminal device according to an embodiment of the disclosure.

In the embodiment of the disclosure, the receiving unit 310 may be implemented by a transceiver and the acquisition unit 320 may be implemented by a processor. As illustrated in FIG. 4, a terminal device 400 may include a processor 410, a transceiver 420 and a memory 430. The memory 430 may be configured to store indication information and may further be configured to store a code, instruction and the like executed by the processor 410. Each component in the terminal device 400 is connected through a bus system. The bus system includes a data bus, and further includes a power bus, a control bus and a state signal bus.

The terminal device 400 illustrated in FIG. 4 may implement each process implemented by the terminal device in the method embodiment. For avoiding repetitions, elaborations are omitted herein.

Figure 5:
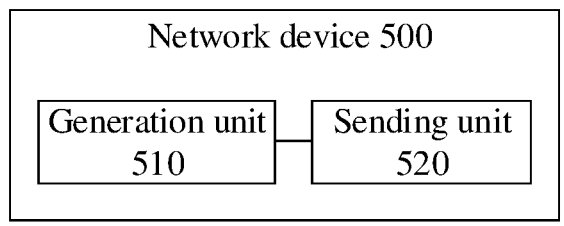
FIG. 5 is a schematic block diagram of a network device according to an embodiment of the disclosure.

FIG. 5 is a schematic block diagram of a network device according to an embodiment of the disclosure.

Specifically, as illustrated in FIG. 5, the network device includes a generation unit 510 and a sending unit 520.

The generation unit 510 is configured to generate indication information. The indication information being used for indicating a paging manner used by a present cell for a terminal device. The sending unit 520 is configured to send the indication information to the terminal device, to enable the terminal device to acquire a paging message according to the indication information.

In at least one embodiment, the sending unit 520 is specifically configured to send SI to the terminal device. The SI includes the indication information.

In at least one embodiment, the sending unit 520 is specifically configured to send a PDCCH scrambled by a P-RNTI to the terminal device. The PDCCH includes the indication information.

In at least one embodiment, the PDCCH further includes scheduling information of the paging message.

In at least one embodiment, the sending unit 520 is specifically configured to send a first message to the terminal device. The first message includes the indication information and the paging message, to enable the terminal device to acquire the paging message in the first message according to the indication information.

In at least one embodiment, the paging manner includes any one of the following: a first paging manner and a second paging manner.

The first paging manner refers to that a CN device triggers an access network device to transmit a paging message and a paged terminal device is identified by an S-TMSI. The second paging manner refers to that the CN device triggers the access network device to transmit the paging message and the paged terminal device is identified by a PI.

Figure 6:
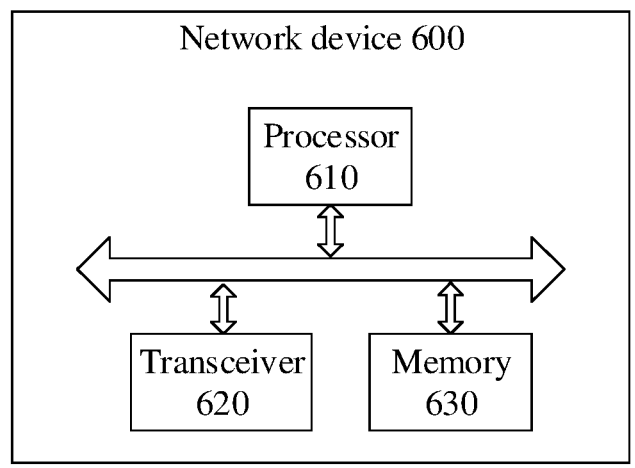
FIG. 6 is a schematic block diagram of another network device according to an embodiment of the disclosure.

In the embodiment of the disclosure, the generation unit 510 may be implemented by a processor and the sending unit 520 may be implemented by a transceiver. As illustrated in FIG. 6, a network device 600 may include a processor 610, a transceiver 620 and a memory 630. The memory 630 may be configured to store indication information and may further be configured to store a code, instruction and the like executed by the processor 610. Each component in the network device 600 is connected through a bus system. The bus system includes a data bus, and further includes a power bus, a control bus and a state signal bus.

The network device 600 illustrated in FIG. 6 may implement each process implemented by the network device in the method embodiment. For avoiding repetitions, elaborations are omitted herein.

In an implementation process, each operation of the method embodiment in the embodiments of the disclosure may be completed by an integrated logical circuit of hardware in the processor or an instruction in a software form. More specifically, the operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

The processor may be an integrated circuit chip with a signal processing capability and may implement or execute each method, operation and logical block diagram disclosed in the embodiments of the disclosure. For example, the processor may be a universal processor, a Digital Signal Processor (DSP), an Application Specific Integrated Circuit (ASIC), a Field Programmable Gate Array (FPGA) or another programmable logical device, transistor logical device and discrete hardware component. In addition, the universal processor may be a microprocessor or the processor may also be any conventional processor and the like.

Moreover, the memory mentioned in the embodiments of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is to be understood that the above memory is exemplarily but unlimitedly described. For example, the memory in the embodiments of the disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). That is, the memory of a system and method described in the disclosure is intended to include, but not limited to, memories of these and any other proper types.

It is to be noted that terms used in the embodiments and appended claims of the disclosure are only for the purpose of describing the specific embodiments and not intended to limit the embodiments of the disclosure.

For example, singular forms "a/an", "said" and "the" used in the embodiments and appended claims of the disclosure are also intended to include plural forms unless other meanings are clearly expressed in the context.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the embodiments of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the embodiments of the disclosure according to a practical requirement.

In addition, each function unit in the embodiments of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the embodiments of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in the embodiments of the disclosure. The abovementioned storage medium includes: various media capable of storing program codes such as a U disk, a mobile hard disk, a ROM, a RAM, a magnetic disk or an optical disk.

The above is only the specific implementation mode of the embodiments of the disclosure and not intended to limit the scope of protection of the embodiments of the disclosure. Any variations or replacements apparent to those skilled in the art within the technical scope disclosed by the embodiments of the disclosure shall fall within the scope of protection of the embodiments of the disclosure. Therefore, the scope of protection of the embodiments of the disclosure shall be subject to the scope of protection of the claims.

The invention claimed is:

1. A method for paging, comprising:
receiving, by a terminal device, indication information sent by a network device, the indication information being used for indicating a paging manner used by a present cell for the terminal device; and
acquiring, by the terminal device, a paging message according to the indication information,
wherein the paging manner comprises any one of the following:
a first paging manner and a second paging manner, wherein
the first paging manner indicates that a core network (CN) device triggers an access network device to transmit a paging message and a paged terminal device is identified by a system architecture evolution (SAE) temporary mobile subscriber identity (S-TMSI), and the second paging manner indicates that the CN device triggers the access network device to transmit the paging message and the paged terminal device is identified by a paging indicator (PI),
wherein receiving, by the terminal device, the indication information sent by the network device comprises:
receiving, by the terminal device, a physical downlink control channel (PDCCH) scrambled by a paging radio network temporary identifier (P-RNTI) from the network device, wherein the PDCCH comprises the indication information and scheduling information of the paging message.

2. The method of claim 1, wherein the scheduling information is used for indicating a resource position of the paging message in a Physical Downlink Shared Channel (PDSCH).

3. A terminal device, comprising:
a transceiver, configured to receive indication information sent by a network device, the indication information being used for indicating a paging manner used by a present cell for the terminal device; and a processor, configured to acquire a paging message according to the indication information, wherein the paging manner comprises any one of the following:

a first paging manner and a second paging manner, wherein the first paging manner indicates that a core network (CN) device triggers an access network device to transmit a paging message and a paged terminal device is identified by a system architecture evolution (SAE) temporary mobile subscriber identity (S-TMSI), and the second paging manner indicates that the CN device triggers the access network device to transmit the paging message and the paged terminal device is identified by a paging indicator (PI), wherein the transceiver is configured to:

receive a physical downlink control channel (PDCCH) scrambled by a paging radio network temporary identifier (P-RNTI) from the network device, wherein the PDCCH comprises the indication information and scheduling information of the paging message.

4. The terminal device of claim 3, wherein the scheduling information is used for indicating a resource position of the paging message in a Physical Downlink Shared Channel (PDSCH).

5. A network device, comprising:

a processor, configured to generate indication information, the indication information being used for indicating a paging manner used by a present cell for a terminal device; and a transceiver, configured to send the indication information to the terminal device, to enable the terminal device to acquire a paging message according to the indication information, wherein the paging manner comprises any one of the following:

a first paging manner and a second paging manner, wherein the first paging manner indicates that a core network device triggers an access network device to transmit a paging message and a paged terminal device is identified by a system architecture evolution (SAE) temporary mobile subscriber identity (S-TMSI), and the second paging manner indicates that the CN device triggers the access network device to transmit the paging message and the paged terminal device is identified by a paging indicator (PI), wherein the transceiver is configured to:

send a physical downlink control channel (PDCCH) scrambled by a paging radio network temporary identifier (P-RNTI) to the terminal device, wherein the PDCCH comprises the indication information and scheduling information of the paging message.

6. The network device of claim 5, wherein the scheduling information is used for indicating a resource position of the paging message in a Physical Downlink Shared Channel (PDSCH).

* * * * *